May 15, 1962
V. D. SNYDER
3,034,338
TESTING SEALS
Filed Dec. 10, 1958
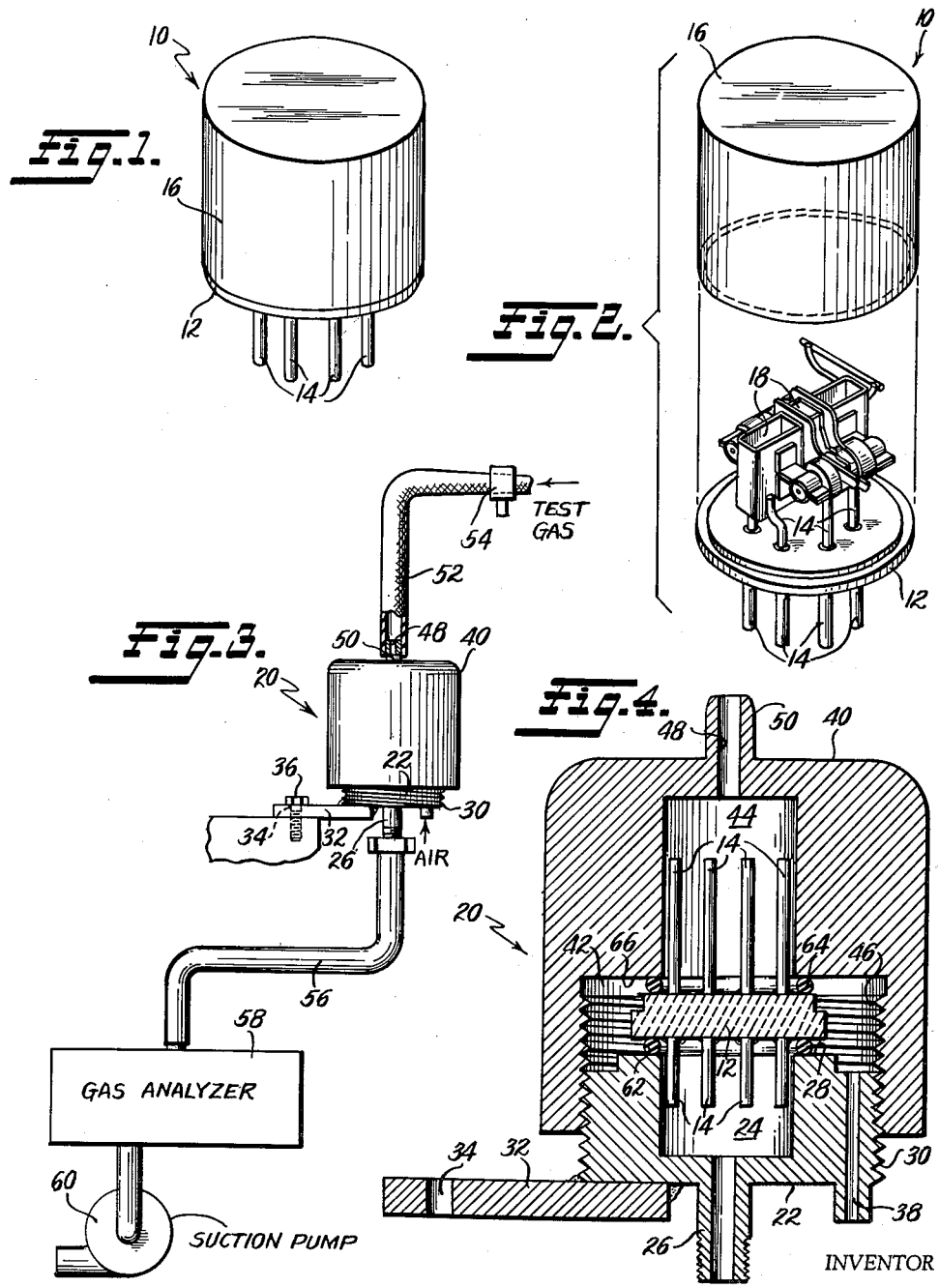
INVENTOR
*Verne D. Snyder*
BY *Michael Hertz,*
ATTORNEY

United States Patent Office 3,034,338
Patented May 15, 1962

---

3,034,338
TESTING SEALS
Verne D. Snyder, Emporium, Pa., assignor, by mesne assignments, to Sylvania Electric Products Inc., Wilmington, Del., a corporation of Delaware
Filed Dec. 10, 1958, Ser. No. 779,476
3 Claims. (Cl. 73—40.7)

This invention relates to apparatus for testing seals and more particularly to apparatus adapted to test the seal between an insulating disc and metal pins sealed through the disc.

The electrodes of an electron discharge device designed and constructed to function reliably under unusual conditions may be enclosed in an envelope. Also one end of the envelope is a stem which in a better quality of device includes a ceramic disc having a plurality of metal pins hermetically sealed through the disc. The pins are connected to the electrodes of the discharge device and are the means for connecting the electrodes to the circuit in which the device is to function.

A ceramic stem is very much more expensive than an ordinary glass stem and likewise an assembly of electrodes enclosed in a ceramic envelope is very much more expensive than an ordinary assembly of electrodes enclosed in a glass envelope. In other words, the discharge devices made for reliable operation under unusual conditions are very expensive and the present high manufacturing cost becomes higher if expensive stems and assemblies are lost because defective parts are not kept out of production.

It is an object of this invention to provide apparatus to accurately test the seal or bond between an insulator, particularly a ceramic disc, and metal pins sealed through the insulator or disc so that an assembly will not be secured to a stem and sealed in an envelope only to learn after complete tube manufacture, that the metal pins and the insulator or ceramic disc of the stem are not bonded together well enough to maintain a desired low pressure within the envelope.

Other objects of the invention will become apparent upon consideration of the following specification when taken in conjunction with the accompanying drawing in which:

FIG. 1 is a view of a completed type of electron device referred to above as being an expensive type to manufacture.

FIG. 2 is a view of the interior of the device with the cover shown displaced.

FIG. 3 is a view of a system utilized to test the leak characteristics of the stem of the electron device embodying a special pressure chamber and FIG. 4 is a cross section through the pressure chamber showing a stem in test position.

Now referring to the drawings with greater particularity, in FIGS. 1 and 2 is illustrated a type of electron tube 10 embodying a wafer 12 through which electrode leads 14 extend and an envelope 16 sealed in air tight relationship to the wafer 12, the tube being exhausted of air and containing therewithin electrodes 18 welded to the leads. Since the structure of the electrodes themselves is unimportant to the invention, no further description thereof is necessary. It is pointed out however that the leads 14 are intended to be sealed to the wafer 12 in air tight relationship and sometimes leaks do develop between the leads and the wafer.

Since if these leaks are not detected in the stem (comprised of the wafer and the sealed in leads) prior to further fabrication of the electron device much loss could ensue, it is desirable, particularly with the higher quality and therefore more expensive types of tubes to provide an efficient test for leakage in the stem prior to assembly of the stem with its mount of electrodes and prior to the envelope being sealed to the wafer.

Such a testing mechanism is disclosed in the diagram of FIG. 3 and in cross section in FIG. 4.

The chamber 20 in which the stem is tested comprises a lower cylindrical block 22 having a central recess 24 vented by an externally threaded boss 26. The upper face of the block has a raised annular machined planar surface 28 surrounding the recess and the block itself is peripherally threaded as indicated at 30. The block 22 may be fastened to any suitable support by means of a strap 32 brazed or welded to the block and provided with one or more holes 34 to accommodate bolts 36. Also passing through the block near the threaded periphery of the block is an air passageway 38. Engaged with the block 22 is a dome 40 having a large chamber 42 in the lower portion of the dome communicating with a recess of lesser diameter 44 than the chamber 42 in the upper portion of the dome. The lower end of the dome is internally threaded as indicated at 46 and is screwed onto the block. The upper end of the dome has a test gas passageway 48 communicating with the chamber 44 and, through a bevelled integral nipple 50 with a flexible hose 52 and pinch valve 54, with a test gas under pressure slightly less than atmospheric. The threaded boss 26 is in air tight relationship with a conduit 56 leading to the test gas analyzer 58 and thence to a suction pump 60. The particular gas used in the test and the particular form of gas analyzer form no part of the invention and therefore need be no further described. In accordance with this invention the stem under test is placed within the chamber 42 with the leads extending into the recesses 24 and 44. A gasket 62 is interposed between the wafer 12 and the surface 28 and a gasket is interposed between the wafer and the machined under surface 66 surrounding the recess 44. After parts are thus arranged the dome is screwed down tight to make as leakproof joint as is feasible without cracking the wafer between the wafer and the two machined surfaces. How much pressure should be applied can be determined either by feel and experience of the operator or by the application of a torque controlled wrench. After the wafer is sealed in place, the hose connection 52 is applied, the suction pump 60 is started and the pinch valve 54 is opened. With the apparatus shown and with gas pressures as described below, if there be no leak between the leads and the wafer, there will be no test or probe gas in the gas analyzer.

It is important for the proper functioning of the test device that the gas supplied to the recess 44 be under a pressure less than that existing in chamber 42 or conversely that the gas in chamber 42 be maintained at a pressure greater than that existing in recess 44. This condition is most easily and cheaply obtained where the chamber 42 is vented to atmosphere and when the probe or test gas is at less than atmospheric pressure. However, the leak test is more effective if probe gas is introduced into chamber 44 at slightly more than atmospheric pressure. This requires that air or other gas, free from probe gas, be introduced through opening 38 into chamber 42 at a pressure slightly greater than the pressure in chamber 44.

With this arrangement if there be leakage past both gaskets while no leakage existed otherwise, there still would be no probe gas in the gas analyzer since the pressure of the gas or air in chamber 42 would merely force that gas or air into the recess 44 and only the gas or air in chamber 42 could leak past the gasket 62 into the suction conduit.

Where the higher than probe gas pressure does not exist in chamber 42, probe gas may leak around both gaskets 62 and 64 and not past the pin or lead in seals. Such gas would then appear in the analyzer giving a false interpretation as to the effectiveness of the pin-to-wafer seals.

Thus the provision of the chamber 42 communicating with a source of non probe gas at a higher pressure than the probe gas contributes to an efficient operation of the system.

What is claimed is:

1. The method for testing an article for leakage therethrough from one surface to another comprising, sealing off each of said surfaces from an ambient atmosphere, leaving on each face exposed to other than the ambient atmosphere, applying suction to one of said exposed areas to create a suction flow, applying test gas to the other of said exposed areas, applying a greater pressure than the test gas pressure to the exterior of the seals and analyzing the suction flow for test gas content.

2. The method for testing a wafer having opposed surfaces with leads extending therethrough for leakage from one surface to another in the seals between the leads and the wafer comprising, sealing off one of the surfaces near the periphery of the wafer from an ambient atmosphere, subjecting the said one surface to a test gas within the peripheral area at a pressure lesss than that of the ambient atmosphere, sealing off the opposed surface of the wafer near its periphery from the ambeint atmosphere, applying suction to said sealed off opposed surface to create a suction flow and analyzing the suction flow for test gas content.

3. Mechanism for testing articles having opposite surfaces for leakage through the article from one surface to the other comprising a holder within which the article is positioned, a gasket between one surface of the article and one part of the holder, a second gasket between the opposite surface of the article and a second part of the holder, means to force the two parts of the holder together to clamp the gaskets against the article and the parts of the holder, means to admit a test gas to one of the parts and to the space within the associated gasket, means to apply suction to the second of the parts and to the space within the second gasket, the space outside of the gaskets being in communication with the ambient atmosphere and the test gas being under a pressure less than that of the ambient atmosphere, the suction pressure being less than the test gas pressure and means to analyze the gas in the suction means.

References Cited in the file of this patent

UNITED STATES PATENTS

| | | |
|---|---|---|
| 2,633,015 | Morris | Mar. 31, 1953 |
| 2,703,978 | Baxter | Mar. 15, 1955 |
| 2,723,554 | Berlin et al. | Nov. 15, 1955 |

FOREIGN PATENTS

| | | |
|---|---|---|
| 765,239 | Great Britain | Jan. 9, 1957 |